(12) United States Patent
D'Haene et al.

(10) Patent No.: US 7,245,079 B2
(45) Date of Patent: Jul. 17, 2007

(54) PLASMA DISPLAY PANEL FILTERS COMPRISING MULTIPLE LAYERS

(75) Inventors: Pol D'Haene, Kessel-Lo (BE); Paul Daniel Garrett, Sturbridge, MA (US)

(73) Assignee: Solutia Incorporated, St. Louis, MO (US)

( * ) Notice: Subject to any disclaimer, the term of this patent is extended or adjusted under 35 U.S.C. 154(b) by 210 days.

(21) Appl. No.: 10/852,682

(22) Filed: May 25, 2004

(65) Prior Publication Data

US 2004/0241458 A1 Dec. 2, 2004

Related U.S. Application Data

(63) Continuation-in-part of application No. 10/446,148, filed on May 28, 2003, now abandoned.

(51) Int. Cl.
*H01J 17/49* (2006.01)

(52) U.S. Cl. ...................................... 313/587; 313/582

(58) Field of Classification Search ......... 313/582–587
See application file for complete search history.

(56) References Cited

U.S. PATENT DOCUMENTS

| | | | |
|---|---|---|---|
| 4,952,457 A | 8/1990 | Cartier |
| 5,061,568 A | 10/1991 | Kessel |
| 5,466,755 A | 11/1995 | Sakagami et al. |
| 5,804,102 A | 9/1998 | Oi et al. |
| 5,811,923 A | 9/1998 | Zieba et al. |
| 5,830,568 A | 11/1998 | Kondo |
| 5,945,209 A | 8/1999 | Okazaki et al. |
| 6,067,188 A | 5/2000 | Zieba et al. |
| 6,084,705 A | 7/2000 | Zieba et al. |
| 6,104,530 A | 8/2000 | Okamura et al. |
| 6,255,031 B1 | 7/2001 | Yao et al. |
| 6,262,364 B1 | 7/2001 | Yoshikawa |
| 6,323,340 B1 | 11/2001 | Masuda et al. |
| 6,333,592 B1 | 12/2001 | Sasa |
| 6,391,462 B1 | 5/2002 | Jang |
| 6,469,685 B1 | 10/2002 | Woodruff et al. |
| 6,522,463 B1 | 2/2003 | Shimomura et al. |
| 6,680,009 B2 | 1/2004 | Harada et al. |
| 2002/0005509 A1 | 1/2002 | Teng |
| 2002/0018890 A1 | 2/2002 | Sugimachi |
| 2002/0140339 A1 | 10/2002 | Lee et al. |
| 2003/0054160 A1 | 3/2003 | Fisher et al. |
| 2003/0128172 A1* | 7/2003 | Terui et al. ................... 345/63 |
| 2003/0186040 A1 | 10/2003 | Oya |
| 2003/0234995 A1 | 12/2003 | Masuda et al. |

FOREIGN PATENT DOCUMENTS

| | | |
|---|---|---|
| EP | 0782164 | 7/1997 |
| EP | 949648 | 10/1999 |
| EP | 1 189 078 | 3/2002 |
| EP | 1197528 | 4/2002 |
| EP | 1251 369 | 10/2002 |
| EP | 1253445 | 10/2002 |
| EP | 1275985 | 1/2003 |
| EP | 1385024 | 1/2004 |
| EP | 1 398 652 | 3/2004 |
| JP | 2002189420 A | 7/2002 |
| JP | 2002189423 A | 7/2002 |
| WO | WO 2004/016053 | 2/2004 |

\* cited by examiner

*Primary Examiner*—Joseph Williams
*Assistant Examiner*—Bumsuk Won
(74) *Attorney, Agent, or Firm*—Brenc Law

(57) ABSTRACT

The present invention is in the field of plasma display panel filters, and more specifically the present invention is in the field of multiple layer plasma display panel filters comprising a PVB layer. Also included are methods of filtering plasma display panel radiation and plasma display panel devices utilizing plasma display panel filters of the present invention.

20 Claims, 11 Drawing Sheets

40  36  38

PLASMA DISPLAY PANEL FILTERS COMPRISING MULTIPLE LAYERS

CROSS-REFERENCE TO RELATED APPLICATIONS

This application claims priority to and is a continuation-in-part of U.S. application Ser. No. 10/446,148 filed on May 28, 2003 now abandoned, which is hereby incorporated by reference in its entirety.

FIELD OF THE INVENTION

The present invention is in the field of plasma display filters, and more specifically the present invention is in the field of multiple layer plasma display filters.

BACKGROUND

Plasma displays panels (PDPs) for televisions and other applications create an image by discharging gas plasma that generates light having desirable characteristics. Relative to conventional cathode ray tubes, PDPs can have superior display capacity, luminance, and contrast. In PDPs, application of a voltage between electrodes creates a discharge of gas plasma, resulting in the emission of ultraviolet (UV) light. The UV emission excites adjacent phosphor materials, resulting in electromagnetic emission of visible light.

PDPs emit plasma having different emission spectra that need to be modified prior to viewing. Optical filters have been used for this purpose. Optical filters can include, for example, a transparent substrate, an antireflective layer on the front surface of the transparent substrate for preventing ambient light reflections, and an electromagnetic wave shield on the rear surface of the transparent substrate.

Conventionally, the antireflective layer can be formed from, for example, silicon oxide or titanium dioxide, and the electromagnetic wave shield can be formed from, for example, copper, silver, palladium, platinum, and gold. Other configurations are known in the art.

Another conventional configuration of a PDP filter employs a coated polyethylene terephthalate (PET) film glued to a glass surface. These conventional arrangements, however, can result in less than ideal appearance, stability, and light reflectance/transmittance characteristics.

What are needed in the art are PDP filters having, relative to conventional PDP filters, enhanced optical quality in combination with easier processing, better impact performance, more stable near infrared (NIR) absorbance/reflectance characteristics, a neutral color, strong electromagnetic (EM) shielding, and a lower total weight.

SUMMARY OF THE INVENTION

The present invention is in the field of plasma display panel filters, and more specifically the present invention is in the field of multiple layer plasma display panel filters comprising a multiple layer construction comprising a PVB or an ethylene vinyl acetate (EVA) layer. Also included are plasma display panel devices utilizing plasma display panel filters of the present invention and methods of filtering plasma display panel radiation.

The present invention includes a layered plasma display panel filter, comprising: a first layer and a second layer disposed in contact with one another, wherein said first layer comprises: polyvinyl butyral or ethylene vinyl acetate; and, a phthalocyanine dye or a dithiol metal complex dye.

The present invention includes a layered plasma display panel filter, comprising: a first layer comprising polyvinyl butyral or ethylene vinyl acetate; a second layer disposed in contact with said first layer, wherein said second layer comprises a polymeric material; a third layer disposed in contact with said first layer, wherein said third layer comprises glass; a fourth layer disposed in contact with said second layer, wherein, said fourth layer comprises polyvinyl butyral or ethylene vinyl acetate; and, a fifth layer disposed in contact with said fourth layer, wherein said fifth layer comprises a polymeric material.

The present invention includes a polymer sheet comprising: a plasticized thermoplastic polymer; and a functional additive system, wherein said functional additive system comprises a phthalocyanine dye.

The present invention includes a method of manufacturing a plasma display panel filter, comprising: disposing a multiple layer polymeric construct in contact with a glass panel; and, laminating said multiple layer polymeric construct to said glass panel, wherein said multiple layer polymeric construct comprises: a first layer comprising polyvinyl butyral or ethylene vinyl acetate; a second layer disposed in contact with said first layer, wherein said second layer comprises a polymeric material; a third layer disposed in contact with said second layer, wherein, said third layer comprises polyvinyl butyral or ethylene vinyl acetate; and, a fourth layer disposed in contact with said third layer, wherein said fourth layer comprises a polymeric material.

DETAILED DESCRIPTION

The present invention relates to PDP filters for use with plasma displays. The present invention includes multiple layer PDP filters where at least one layer comprises polyvinyl butyral (PVB) or ethylene vinyl acetate (EVA). These layers can include a near infrared (NIR) absorber or other agents. Other embodiments of the present invention can include various additional layers, including further PVB or EVA layers, polymer layers (such as PET or PEN (polyethylene napthalate) layers) supporting an antireflective layer (such as a coated titanium dioxide or silicon oxide layer), an electromagnetic shielding layer (such as a copper grid or an equivalent material, such as silver, palladium, platinum, and gold), and layers comprising other materials as are known in the art.

The present invention specifically includes layered PDP filters comprising a layer comprising PVB or EVA disposed in contact with at least one other layer. In further embodiments, multiple layers, for example 2, 3, or 4, layers of PVB or EVA or both can be included in a PDP filter. As will be apparent to one of ordinary skill in the art from the description and examples below, the inclusion of one or more layers of PVB into a layered PDP filter can provide a filter that has a more appealing appearance, has better stability over time, has better flexibility, can be manufactured to a thinner overall thickness without unacceptable degradation of mechanical properties, and has better transmission, reflectance, and absorbance characteristics relative to filters lacking a PVB layer.

Figure 4:
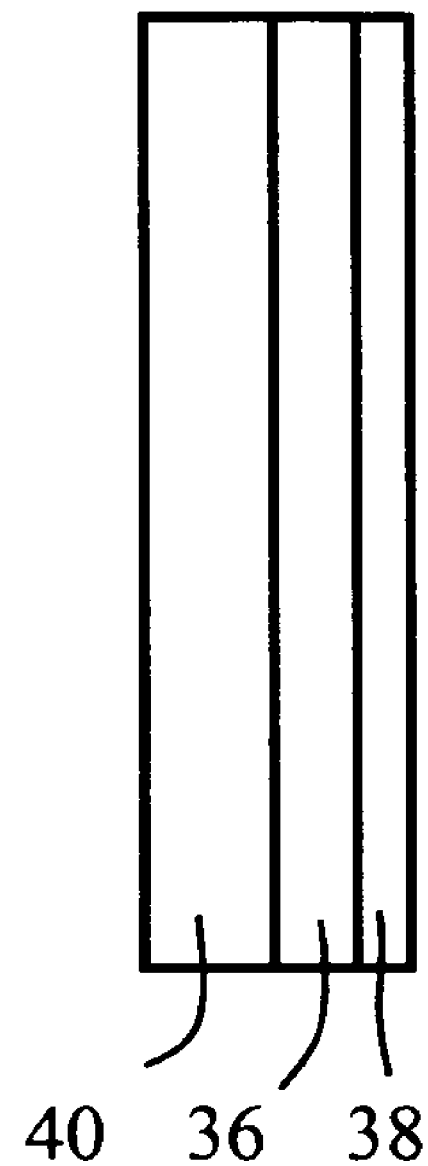
FIG. 4 represents a schematic cross section of one embodiment of a PDP filter of the present invention.

In one embodiment, the present invention allows for the manufacture and use of a simple, effective multiple layer PDP filter having three layers: a PVB or EVA layer; a layer of polymer such as PET or PEN; and a layer of glass. This particular embodiment is shown in FIG. 4 and is described in detail below.

PVB and EVA layers used in filters of the present invention can comprise any conventional PVB that is suitable for the application. Specifically contemplated are PVB formulations disclosed in U.S. Pat. Nos. Re. 20,430; 2,496,480; 3,271,235; 5,853,828; 6,093,471; and, 6,559,212.

In one embodiment of the present invention, PVB resin used to form any one or more PVB layers comprises 2 to 50 weight percent, 5 to 40, 8 to 35, or 10 to 30 weight percent hydroxyl groups expressed as polyvinyl alcohol, and 0 to 5 weight percent, 0 to 4, 0 to 3, or 0 to 2.5 weight percent acetate expressed as polyvinyl acetate, with the balance being butyral expressed as polyvinyl butyral. PVB sheets are commercially available from Solutia Inc., (Springfield, Mass.) as Saflex® and E. I. Dupont de Nemours and Company (Wilmington, Del.) as Butacite®.

Plasticized PVB sheet at a thickness of about 0.13 mm to 1 .3 mm, for example, can be formed by extruding the mixed formulation through a sheet die, for example by forcing molten, plasticized PVB through a horizontally long vertically narrow die opening substantially conforming in size to the sheet being formed, or by casting molten polymer issuing from an extrusion die onto a die roll in close proximity to the die exit to impart the desired surface characteristics to one side of the polymer. For example, the roll surface can have minute peaks and valleys, thereby causing the side of the sheet contacting the roll to have a rough surface generally conforming to the valleys and peaks on the roll surface. Roughness on the other side can be provided by the design of the extrudate die opening. Other known techniques for producing a rough surface on one or both sides of an extruding sheet involve specifying and controlling polymer molecular weight distribution, water content, and/or temperature of the melt. These techniques are disclosed in U.S. Pat. Nos. 2,904,844; 2,909,810; 3,994, 654; 4,575,540 and European Patent No. EP0185863. Embossing downstream of the extrusion die also can be used to roughen the sheet surface. As is known, this roughness is temporary and is imparted to facilitate deairing during laminating after which elevated temperature and pressure during bonding of the sheet to glass melts can melt the sheet to a smooth finish. The finished sheet can be laminated to glass or other layers according to generally known procedures.

In various embodiments of the present invention a PVB layer can contain 10 to 90, 20 to 80, 20 to 60, or 25 to 45 parts of plasticizer per 100 parts of PVB resin. Examples of plasticizers are disclosed in U.S. Pat. No. 4,654,179. In one embodiment, dihexyl adipate and/or triethylene glycol di-2 ethylhexanoate are used.

Layers of PVB and EVA of the present invention can additionally comprise additives to improve performance such as dyes, pigment colorants, UV stabilizers, antioxidants, glass adhesion control agents, and the like.

The PVB and EVA layers of the present invention can comprise an optical filter agent absorbing at 590 nm, which preferably is compatible with the PVB or the EVA. In various embodiments, the agent absorbing at 590 nm selectively absorbs at 590 nm, which means the agent absorbs light in a very narrow band around 590 nm. This optical filter serves as an absorber of the light specifically emitted by the excited neon gas, which typically is part of the gas of the plasma display unit. This wavelength preferably is absorbed in order to obtain an improved color balance. Examples of potential optical filter agents include, but are not limited to, cyanine-based dye, azulenium-based dye, squalium-based dye, diphenylmethane-based dye, triphenylmethane-based dye, oxazine-based dye, azine-based dye, thiopyrylium-based dye, viologen-based dye, azo-based dye, metal azo-based complex dye, bisazo-based dye, naphthoquinone-based dye, anthraquinone-based dye, perylene-based dye, indanthrone-based dye, phthalocyanine-based dye, napthalocyanine based dye, nitroso-based dye, metal dithiol-based dye, indoaniline-based dye, quinoline-based dye. Examples of useful dyes include Gentex Filtron A178 (Gentex Corp., Carbondale, Pa.), Gentex Filtron A193, Pyrromethene 650 (Lambda Physik, Gottingen, Germany), and DQOCI (Lambda Physik), among others.

In addition, the PVB or EVA of the present invention can comprise one or more NIR absorbers. The main purpose of an NIR absorber is to absorb radiation in the wavelength range of 800 nm to 1200 nm, which facilitates the use of remote control devices operating within this frequency range. Examples of useful NIR absorber agents include, but are not limited to, cyanine-based dye, azulenium-based dye, squarylium-based dye, diphenylmethane-based dye, triphenylmethane-based dye, oxazine-based dye, azine-based dye, thiopyrylium-based dye, viologen-based dye, azo-based dye, metal azo-based complex dye, bisazo-based dye, naphthoquinone-based dye, anthraquinone-based dye, perylene-based dye, indanthrone-based dye, phthalocyanine-based dye, napthalocyanine based dye, nitroso-based dye, metal dithiol-based dye, indoaniline-based dye, quinoline-based dye. Examples of useful dyes include Gentex Filtron A101, Gentex Filtron A195, Keystone TB225 (Keystone Aniline Corp., Chicago Ill.), Keysorb 975 nm, TN228 Keysorb 993 nm, IR5, IR26, IR132 from Lambda Physik, or quaterrylenetetracarboxylic diimides such as those disclosed in published U.S. patent application 20020182422.

NIR absorption can also be accomplished using nanoparticle technology and may include the inclusion of ATO (antimony tin oxide), ITO (indium tin oxide, U.S. Pat. No. 5,830,568), or $LaB_6$ (lanthanum hexaboride, U.S. patent application 200200086926), semiconductor nanoparticles, among others.

In a preferred embodiment, one or more PVB or EVA layers of a filter of the present invention comprise an NIR absorber, and in specific embodiments the NIR absorber is selected from the group consisting of $LaB_6$, Gentex Filtron A101, Gentex Filtron A195, Gentex Filtron A208, and quaterrylenetetracarboxylic diimides.

It has surprisingly been discovered that phthalocyanine dyes and dithiol metal complex dyes are particularly suitable for use as NIR reducing agents in the PVB/EVA layers of the present invention. These dyes, as shown in the examples, offer surprisingly good thermal stability and NIR absorption, without also excessively negatively impacting the color properties and light transmission properties of the layer.

In various embodiments of the present invention, one or more of the PVB/EVA layers comprises a phthalocyanine dye, a dithiol metal complex dye, $LaB_6$, or combinations thereof.

In various embodiments, one or more of the PVB/EVA layers comprise a phthalocyanine dye. The phthalocyanine dye can be combined with any of the other agents disclosed herein. Preferred phthalocyanine dyes include Excolor IR12, Excolor IR14, TX-Ex 906B, TX-Ex 910, and Excolor IR10A (available from Nippon Shokubai (Osaka, Japan)), Pro-jet 90ONP and Pro-jet 830NP (available from Avecia, Manchester, United Kingdom), and YKR-3070, YKR-3080, and YKR-3081 (available from Yamamoto Chemicals, Inc. Osaka, Japan). Other phthalocyanine dyes that can be used include those disclosed in U.S. Pat. No. 6,323,340 and those available from Mitsui Chemicals, Incorporated, Tokyo, Japan, and Keystone Aniline Corporation, Chicago, Ill.

These phthalocyanine dyes can be incorporated into the PVB/EVA layers of the present invention in any suitable concentration, depending on the application, as will be readily determinable by those of skill in the art. In various embodiments, for example, phthalocyanine dyes are incorporated into a polymer sheet of 0.5 mm thickness at a weight/weight concentration of 0.01 to 0.20, 0.015 to 0.15, or 0.05 to 0.10. Generally, sheets of greater thickness can have lower concentrations of phthalocyanine dyes, and sheets of lesser thickness can have greater concentrations of phthalocyanine dyes to achieve the desired results.

In various embodiments of the present invention, the phthalocyanine dye comprises one or more NHR-side groups, one or more SR-side groups, and, optionally, a halogen group, where the R is a substituted or non-substituted phenyl, alkyl, or aryl group. In various embodiments of the present invention, the phthalocyanine dye is complexed with antimony.

In various embodiments of the present invention, the phthalocyanine dye comprises one or more NHR-side groups and, optionally, a halogen group, where the R is a substituted or non-substituted phenyl, alkyl, or aryl group.

In various embodiments of the present invention, the phthalocyanine dye comprises one or more SR-side groups, and, optionally, a halogen group, where the R is a substituted or non-substituted phenyl, alkyl, or aryl group.

In various embodiments, one or more of the PVB/EVA layers comprise a dithiol metal complex dye. Any PVB/EVA compatible dithiol metal complex dye as is known in the art can be used, and examples include those disclosed in U.S. Pat. No. 6,522,463 and EP 1385024. In various embodiments, the dithiol metal complex dye is MIR-101 (available from Midori Kagaku Company, Tokyo, Japan). In various embodiments, the dithiol metal complex dye is Gentex Filtron A208 (available from Gentex Corporation, Carbondale, Pa.).

In various embodiments, one or more of the PVB/EVA layers comprise $LaB_6$.

In general, the dye used can be chosen because it provides a high visible/NIR transmission ratio and provides a relatively flat transmission across the visible spectrum. In various embodiments of the present invention, a polymer sheet comprising a phthalocyanine dye, a dithiol metal complex dye, or both, will have the following optical characteristics when produced at a thickness of 450 microns laminated between two sheets of 2 mm thick glass:

a transmission below 2%, 1.5%, or 1% over the range of 300-380 nm a transmission from 30% to 70%, 35% to 70%, or 35% to 65% over the ranges of 400-582 nm and 596-780 nm a transmission of less than 60%, less than 50%, or less than 40% over the range of 583-595 nm variation of less than 15%, 13%, 10%, 7%, or 5% over the ranges of 420-579 nm and 611-800 nm a transmission of less than 20%, 17.5%, or 15% over the range of 800-1,000 nm a transmission of less than 15%, 12.5%, or 10% over the range of 820-980 nm and a color transmission value a* in the range −7 to 7, −6 to 6, −5 to 5, or −5 to 0 and a b* value in the range −15 to 7, −12 to 6, −10 to 5, or −10 to −2.

The different ranges given above for the optical properties can be combined in any suitable combinations, as desired.

In various embodiments of the present invention, a polymer sheet is provided comprising a thermoplastic polymer, such as PVB, EVA, or polyurethane, having the optical properties just described and a functional additive system. In these embodiments, the polymer can comprise from 98 to 99.9% by weight of the sheet, with the functional additive system constituting 0.01 to 2%, 0.2 to 1%, or 0.2 to 1.5% by weight of the sheet. In these embodiments, the functional additive system comprises, on a weight basis, 0 to 50% of a UV stabilizer as disclosed herein and as known in the art, 1 to 10% or 2 to 6% of a porphyrin dye, for example Gentex Filtron A178 and A193 (available from Gentex Corp., Carbondale, Pa.) and those manufactured by Mitsui Chemicals Incorporated, Tokyo Japan, as is known in the art, 49 to 95% or 65 to 95% of an NIR absorbing dye, and 0 to 50% or 5 to 30% of an organic dye or pigment, with the ranges combinable in any suitable arrangement. In these embodiments, the NIR absorbing dye can be any disclosed herein, and specifically can be a phthalocyanine dye, napthalocyanine dye, $LaB_6$, or dithiol metal complex dye.

Because NIR absorbers can introduce a yellow-greenish color aspect to the PVB or EVA layer, a color correction preferably can be achieved by adding colorants to the PVB or EVA layer. Such colorants can include pigments or dyes absorbing in a particular wavelength region that are specifically chosen to change the color of the spectrum as is known in the art.

In various embodiments of the present invention, one or more colorants may be admixed with the PVB or EVA or printed on the surface of the PVB or EVA sheet, such as disclosed in U.S. Pat. Nos. 3,922,456 and 3,982,984. In one embodiment copper phthalocyanine pigment blue can be used as a colorant (Sigma-Aldrich Corp., St. Louis, Mo.). In another embodiment, C.I. solvent blue 102, which is available as "KEYSTONE BLUE RC" (Keystone Aniline Corp., Chicago Ill.), can be used as a colorant.

Using the CIELAB system, a well-known international standard for color measurement, the color of an object under fixed viewing conditions can be defined. A set of dimensionless coordinates L*, a*, b* are used to define a color's hue and intensity. These coordinates are measured according to instructions provided in the publication "Standard Practice for Computing the Colors of Objects by Using the CIE System," ASTM E 308-01. The wavelength range is between 400 nm and 700 nm, at a wavelength interval of 20 nm. The coordinate L* is used to measure the lightness or darkness of a color. White is denoted by L*=100 and black is denoted by L*=0. The coordinate a* measures the level of green or red color in the object, and the coordinate b* measures the level of blue or yellow in the object.

Alternatively, NIR absorbers can be partially or completely eliminated from the PVB or EVA and replaced by coated glass, a coated polymer structure (typically PET), or with a multilayer film, such as the those available from 3M and described in U.S. Pat. No. 6,498,683, among others.

It is also possible to combine NIR absorbers with coated glass, coated polymer, or multilayer films in order to achieve the desired result. For example, a combination of NIR absorbers in PVB with IR reflecting films is reported in U.S. application Pat. No. 20030054160, which also reports NIR absorbers coated on PET and combined with PVB.

These combinations can be used with embodiments of the present invention, as appropriate.

In any of the embodiments of the present invention in which an agent is added to the PVB or EVA layer to impart desired characteristics, it is generally possible and will be appreciated by those with skill in the art that some or all of the added agents can be applied to the PET or PEN polymer layer or glass layer instead of or in addition to the agent's inclusion in the PVB layer. For example, a PET layer can be coated with $LaB_6$ and then laminated to a layer of PVB having no pigment or a reduced level of pigment.

Some of the agents contemplated herein can also be directly applied to a glass layer that is then laminated to a layer of PVB. Any of the agents of the present invention referred to herein can be used in this manner, where appropriate.

As used herein, "glass" means any form of glass as is commonly known in the art, but not limited to glass consisting essentially of silicon dioxide. In various embodiments of the present invention the glass comprises silicon dioxide or is essentially all silicon dioxide.

A particular benefit of the present invention is improved overall electromagnetic radiation transmission, absorbance, and reflectance characteristics. PDP filters of the present invention as described elsewhere herein employing at least one PVB layer include filters that preferably have the following qualities when the PVB layer is laminated between two layers of glass each having a thickness of 2 millimeters: transmission in the visual range of 20 to 60 percent, 30 to 50 percent, or 35 to 45 percent, transmission at 590 nanometers of 0 to 65 percent, 5 to 50 percent, 10 to 40 percent, or 20 to 30 percent;

transmission at 800 nanometers of less than 30 percent, 25 percent, or 20 percent, transmission at 850 nanometers of less than 25 percent, less than 20 percent, or less than 15 percent, transmission in the 900 to 1100 nanometer range of less than 15 percent, less than 12 percent, less than 10 percent, or less than 6 percent; transmission in the 1100 to 1200 nanometers of less than 15 percent or less than 10 percent. Any of the above given ranges can be combined with each other in any combination in any of the various embodiments of the present invention to achieve the desired result.

In a further embodiment, two or more layers of PVB or EVA are used to achieve, cumulatively, the same optical qualities given above. In one embodiment, a multiple layer PDP filter of the present invention comprises two layers of PVB or EVA, each of which has had agents added to it to yield a net optical transmission effect as given above for a single layer. For this embodiment, two layers of PVB or EVA or one of each can be layered with 2.0 mm glass in order to establish the optical properties. In one embodiment of the present invention, a filter comprises two layers of PVB or EVA or one of each, and the two layers of PVB or EVA or both have the following properties when those layers are disposed in the order 2.0 mm glass//PVB or EVA layer//2.0 mm glass//PVB or EVA layer//2.0 mm glass (i.e. when laminated with three layers of 2.0 mm glass): transmission in the visual range of 20 to 60 percent, 30 to 50 percent, or 35 to 45 percent, transmission at 590 nanometers of 0 to 65 percent, 5 to 50 percent, 10 to 40 percent, or 20 to 30 percent; transmission at 800 nanometers of less than 30 percent, 25 percent, or 20 percent, transmission at 850 nanometers of less than 25 percent, less than 20 percent, or less than 15 percent, transmission in the 900 to 1100 nanometer range of less than 15 percent, less than 12 percent, less than 10 percent, or less than 6 percent; transmission in the 1100 to 1200 nanometers of less than 15 percent or less than 10 percent. Any of the above given ranges can be combined with each other in any combination in any of the various embodiments of the present invention to achieve the desired result.

In the foregoing embodiment and in any other embodiments of the present invention comprising two layers of PVB or EVA or both, the two layers of PVB or EVA or both can be disposed in contact with one another and then disposed between any of the other layers given herein, for example between a layer of PET and a layer of glass. This arrangement can be useful if, for example, it is desired to impart different optical qualities on two layers of PVB or EVA using the agents described herein rather than imparting all of the qualities on a single sheet of PVB or EVA. This alternative embodiment is useful, for example, when two or more agents can not be readily disposed on a single layer of PVB or EVA. By combining two layers of PVB or EVA or both, an embodiment similar to the one shown in FIG. 4 can be produced wherein the single middle PVB or EVA layer is replaced with two layers of PVB or EVA or both, leading to a final arrangement of: polymeric material such as PET//PVB or EVA layer//PVB or EVA layer//glass layer.

For any PVB or EVA layer in a filter of the present invention, preferable a* and b* factor (as based on the L*a*b* calorimetric system) values are −15 and +15, −10 and +10, −5 and +5, and −2 and +2.

In any of the embodiments described below and depicted schematically in cross section in the figures, one or both of the PVB layers shown can be substituted with an EVA layer. For any of the embodiments of the present invention in which PVB is used, any other suitable thermoplastic polymer, as are known in the art can be used, including, but not limited to, polyurethane.

Figure 1:
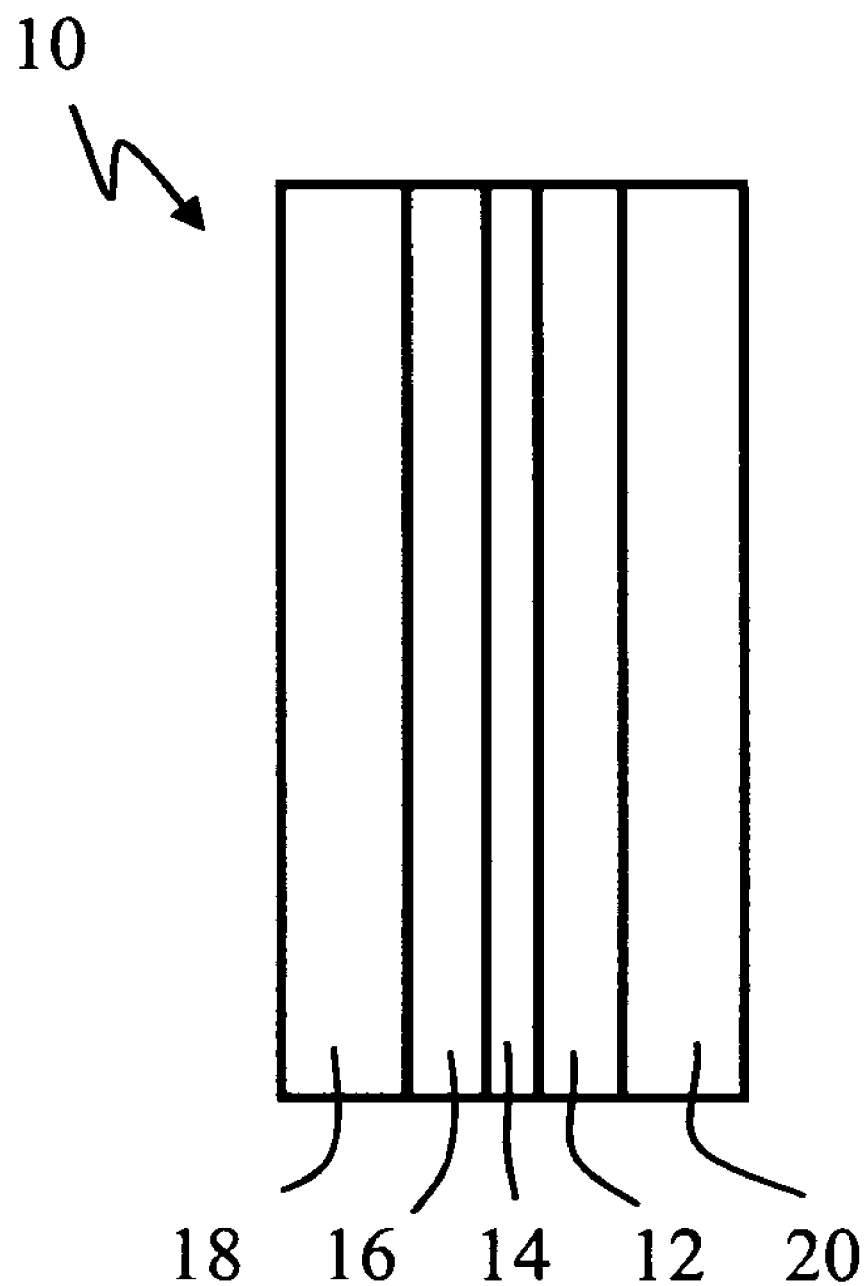
FIG. 1 represents a schematic cross section of one embodiment of a PDP filter of the present invention.

One embodiment of the present invention is shown in schematic cross section generally at 10 in FIG. 1. As shown, a first layer 12 comprising PVB is disposed in contact with a second layer 14. This second layer can comprise a polymer, for example PET or PEN and, optionally, an electrically conductive component, such as a copper grid, or an NIR absorbing or reflective coating. A third layer 16 comprising PVB is disposed in contact with the second layer 14. Either of the PVB layers can comprise any of the additional agents described elsewhere herein. In one embodiment both PVB layers have the same composition and contain both an agent absorbing at 590 nm, an NIR absorbing agent, and a color modifying pigment or dye. In another embodiment, a 590 nm absorbing agent is disposed in only one of the PVB layers, while an NIR absorbing agent is disposed only in the other PVB layer. In any of the embodiments described herein in which a PET layer is used, a PEN layer can alternatively be substituted.

A fourth layer 18 comprising an anti-reflecting glass panel is disposed in contact with the third layer 16 and serves as the viewing surface. Other viewing surfaces, as are known in the art, can readily be substituted for the fourth layer. A fifth layer 20 is disposed in contact with the first layer 12, and this fifth layer comprises a coated glass layer.

The arrangement of layers shown in FIG. 1, it will be seen, is only one possible, exemplary arrangement of layers, and one skilled in the art will recognize that many different configurations are possible using one or more PVB and/or EVA layers.

In the arrangement shown in FIG. 1, preferred layer thicknesses are as follows: first and third layers (for PVB or EVA), less than 1 millimeter, 0.8, 0.6, or 0.4 millimeter thick; second layer, less than 200 microns, 180, 160, 140, 120, or 100 microns thick; fourth layer, less than 3.5 millimeters, 3.0, 2.5, 2.3, or 2.0 millimeters thick; and fifth layer, less than 2.5 millimeters, 2.0, 1.7, or 1.5 millimeters thick. Other embodiments of the present invention utilize layers having thicknesses different than those given above, in accordance with the particular application. The embodiment shown in FIG. 1 is preferably less than 5.5 millimeters, 5.0, 4.7, 4.5, 4.25, or 4.0 millimeters in total thickness.

Figure 2:
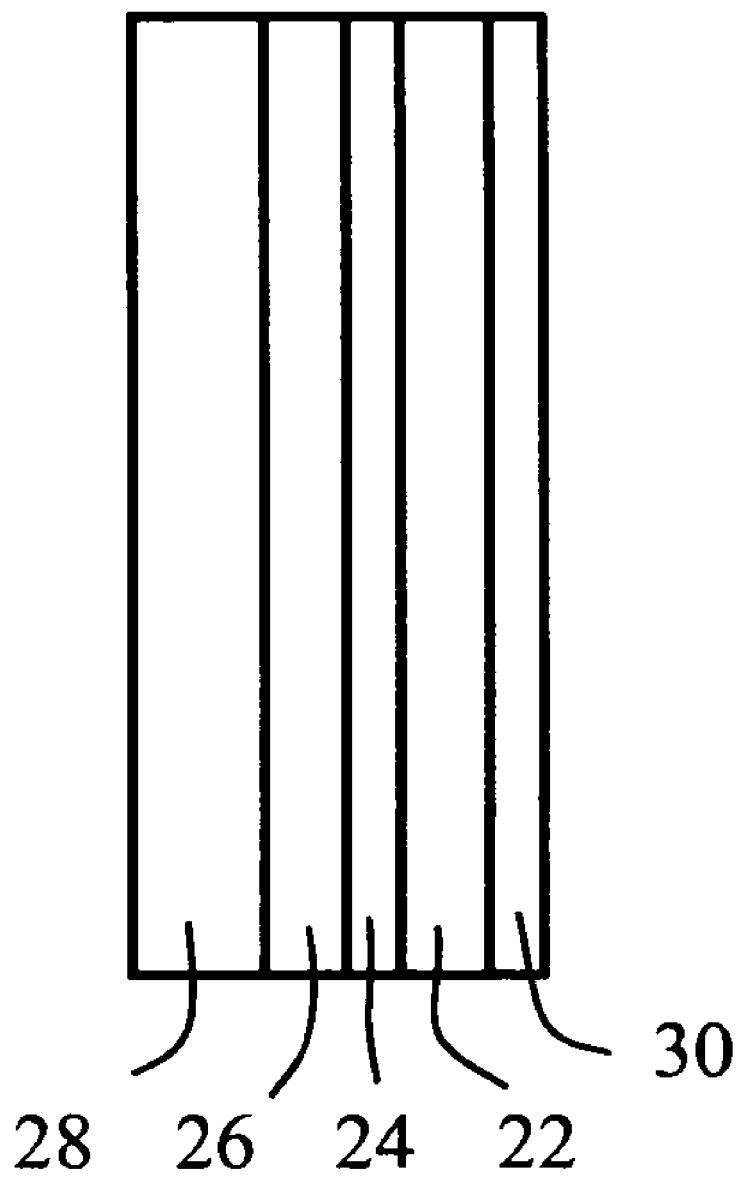
FIG. 2 represents a schematic cross section of one embodiment of a PDP filter of the present invention.

Another embodiment of the present invention is shown in schematic cross section in FIG. 2. The various layers of the embodiment shown in FIG. 2 can comprise various components as described elsewhere herein. As shown in FIG. 2, a first layer 22 comprising PVB is disposed in contact with a second layer 24. The second layer 24 can comprise PET, for example a PET film product produced by 3M (St. Paul, Minn.) or CPFilms (Martinsville, Va.). In this embodiment, this layer of PET can optionally comprise a copper grid or equivalent material. A third layer 26 disposed in contact with the second layer 24 comprises PVB having an agent that absorbs radiation in the 590 nanometer range, as described above. A fourth layer 30 disposed in contact with the first layer 22 comprises PET or equivalent material and optionally has a copper grid or equivalent material. In this embodiment the fourth layer 30 faces the PDP. An anti-scratch layer (not shown), comprising silicon dioxide, for example, may optionally be disposed in contact with the fourth layer 30. A fifth layer 28 is disposed in contact with the third layer 26 and comprises glass with an anti-reflective coating. This embodiment provides the advantage of a thinner overall filter that retains the desired properties. The first and third layers 22, 26 of this embodiment are preferably less than 1 millimeter, 0.8, 0.6 or 0.4 millimeters thick. Other layers and the sum of all the layers can have, for example, the thicknesses described above for the embodiment shown in FIG. 1.

In other embodiments of the present invention, the embodiment shown in FIG. 2 is configured according to the following: glass//PVB or EVA//PET with EM shielding//PVB or EVA//PET with anti-reflective shielding, with the glass facing the PDP and the PET layer with anti-reflective shielding facing the viewer. The PET layer with EM shielding can comprise any suitable shielding and as disclosed elsewhere herein, and the shielding can be disposed on either side of the PET layer or within the layer. The PET layer having the anti-reflective shielding can have the shielding disposed on either side of the PET layer or within the layer. The thicknesses of the individual layers and the combination of all the layers can be as described elsewhere herein.

In these embodiments, either one or both PVB/EVA layers can comprise agents such as UV absorbers, NIR absorbers (specifically the phthalocyanine, $LaB_6$, and dithiol metal complex dyes described elsewhere herein), 590 nanometer absorbers, and color adjusting agents. These agents can be added to one or both of the PVB/EVA layers in any suitable manner and as disclosed elsewhere herein to achieve the desired optical properties.

In these and all embodiments of the present invention, one or both PET layers can comprise a material similar to PET as disclosed elsewhere herein, the PVB/EVA layers can be any similar, suitable material, as disclosed elsewhere herein, and the glass layer can alternatively comprise any suitable glazing type material, such as rigid plastics having a high glass transition temperature, for example above 60° C. or 70° C., for example polycarbonates and polyalkyl methacrylates, and specifically those having from 1 to 3 carbon atoms in the alkyl moiety.

These embodiments can additionally comprise more layers of the type disclosed herein throughout, including PVB and PET type layers.

The present invention also includes a multiple layer polymeric laminate that comprises the four layer construct PVB or EVA//PET with EM shielding//PVB or EVA//PET with anti-reflective shielding, as described above, wherein the laminate can be further laminated to a panel of glass or other rigid substrate. This multiple layer laminate affords the advantage of a single laminated construct that can be applied to a substrate in a single step, thereby reducing the complexity of forming a PDP filter having a rigid substrate. Accordingly, the present invention also includes a method for manufacturing a PDP filter, comprising forming any of the multiple layer polymeric laminates according to the present invention, and laminating the construct onto a rigid substrate, such as glass, in a single step to form the completed PDP filter.

Figure 3:
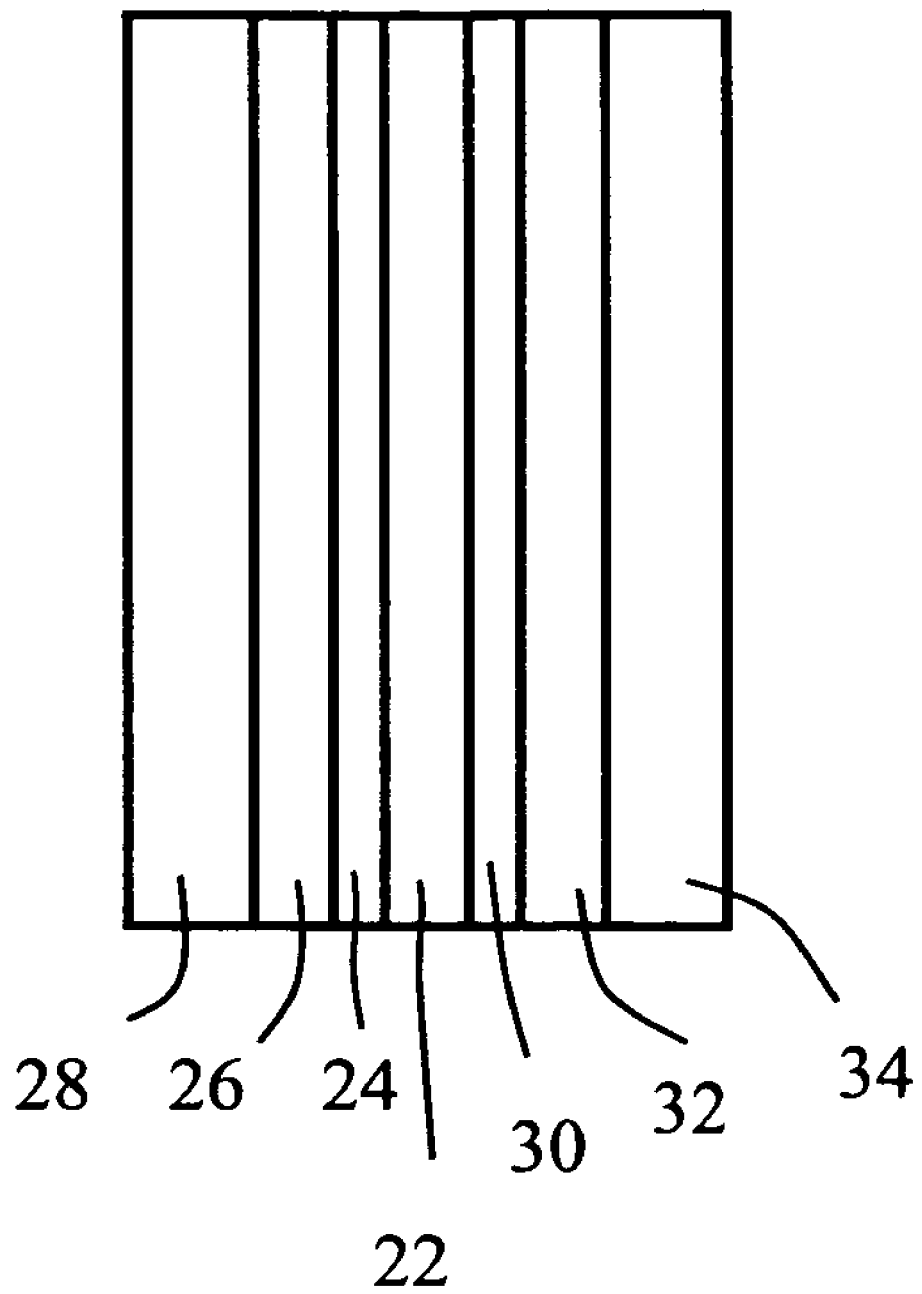
FIG. 3 represents a schematic cross section of one embodiment of a PDP filter of the present invention.

FIG. 3 represents a schematic cross section of another embodiment of a PDP filter of the present invention. This embodiment adds two layers to the embodiment shown in FIG. 2. In this embodiment, a sixth layer 32 is disposed in contact with the fourth layer 30. The sixth layer comprises a PVB layer. In one embodiment, this sixth layer does not have added agents and is clear PVB. A seventh layer 34 is disposed in contact with the sixth layer 32 and can comprise, for example, a protective layer such as a glass layer. Thicknesses for the various layers are as above for the embodiment shown in FIG. 2, except for in this embodiment the first, third, and sixth layers 22, 26, 32 are preferably less than 1.0 millimeter, 0.7, 0.5, 0.4, 0.3, or 0.2 millimeters thick. Other layers and the sum of all the layers can have, for example, the thicknesses described above for the embodiment shown in FIG. 1.

Another embodiment of the present invention is shown in schematic cross section in FIG. 4 and has the advantage of having a relatively thin configuration. In this configuration a first layer 36 is disposed in contact with a second layer 38. The first layer 36 comprises PVB comprising one or more of the following three agents: an agent absorbing at 590 nm, an NIR absorbing agent, and an agent for adjusting color. The thickness of the first layer 36 can be less than 1 mm, 0.8 mm, 0.6 mm, or 0.4 mm. The second layer 38 comprises PET containing an electrically conductive coating or a copper grid. This second layer 38 faces the PDP. A third layer 40 is disposed in contact with the first layer 36 and consists of an anti-reflective glass. In this embodiment, the total thickness of the filter, that is, all three layers, is preferably less than 4 mm, 3.5, 3, 2.5, or 2 mm. As shown in this embodiment, one PDP filter of the present invention has no more than three distinct layers laminated together to form a filter.

As used herein, a "layer" can be formed by any method known in the art and can include any distinct portion of the total thickness of the filter that is disposed between and physically separates two other layers. For example, layers can be distinct compositions laminated together to form a multi-layer filter. Layers can also be formed by direct deposition of the material that forms the layer onto an existing layer, among other techniques. In a preferred embodiment, PDP filters of the present invention comprise layers formed by laminating glass, plastic films, and/or other preformed components into a single finished filter. Any methods conventionally used in the art for laminating or depositing layers can be used.

The present invention also includes methods for filtering the electromagnetic radiation produced by a plasma display panel, comprising passing said radiation through any of the PDP filters within the scope of this invention, for example a plasma display panel filter comprising a first layer and a second layer disposed in contact with one another, wherein said first layer comprises polyvinyl butyral.

The present invention further includes devices that use PDPs in which a PDP filter within the scope of the present invention is used. Examples include, but are not limited to monitors or televisions.

The use of multiple layer PDP filters of the present invention can impart improved stiffness to a filter relative to conventional arrangements, thereby reducing the overall thickness and/or weight of the filter while retaining impact performance.

The following examples illustrate various embodiments of the present invention.

EXAMPLE 1

Figure 5:
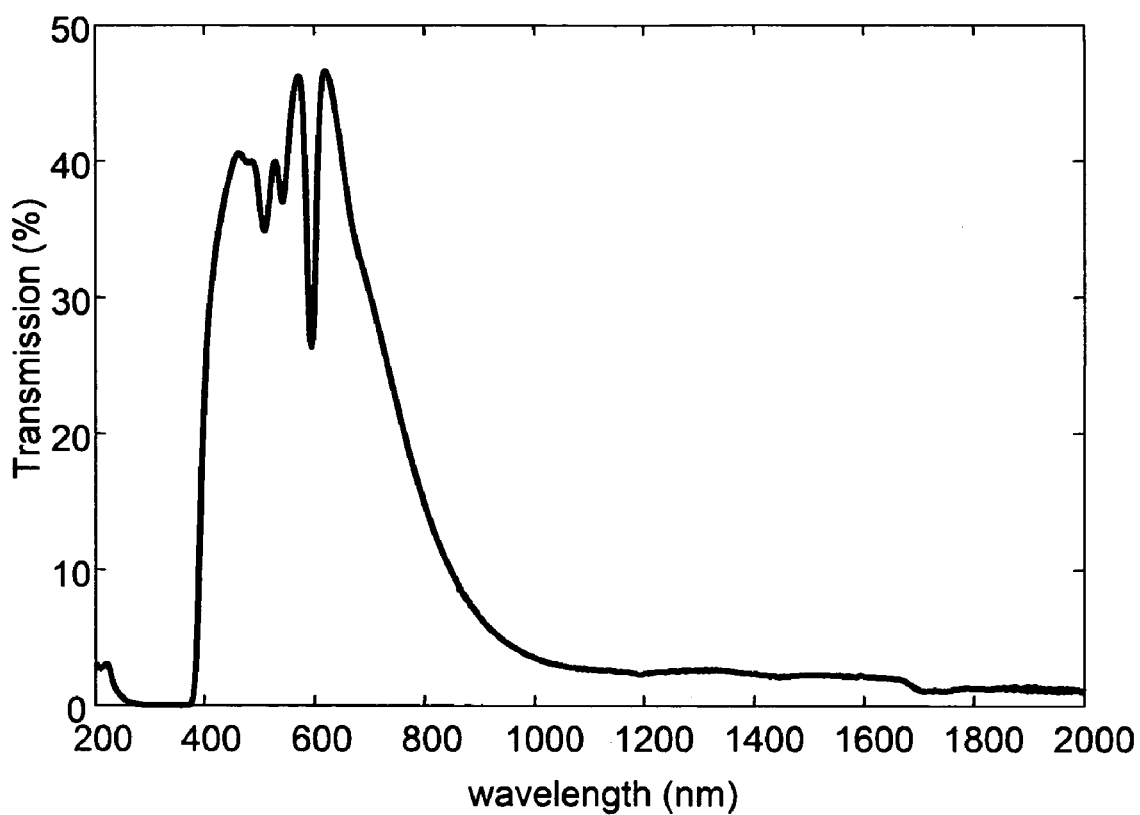
FIG. 5 represents a graph illustrating the transmission of electromagnetic radiation through one embodiment of a plasma display panel filter of the present invention.

FIG. 5 shows a graph of percent transmission of electromagnetic radiation having wavelengths ranging from 200 to 2000 nanometers through one embodiment of the present invention. In this example, the filter has the following configuration: anti-reflective glass//PVB//PET with EM shielding (cu-grid)//PVB//coated glass. The PVB contains 0.0095% of C.I. pigment red (Clariant, Germany), 0.011% of $LaB_6$ and 0.0031% of Gentex Filtron A178. Also a UV stabilizer is added to the PVB.

As shown in FIG. 5, transmission around the 590 nanometer range is limited to less than 50 percent transmission, while transmission over 900 nanometers and less than about 380 nanometers is less than about 5 percent. The color obtained in this particular system can be described by the calometric $L^*a^*b^*$-system with values for $a^*=-0.7$ and for $b^*=0.2$.

Figure 6:
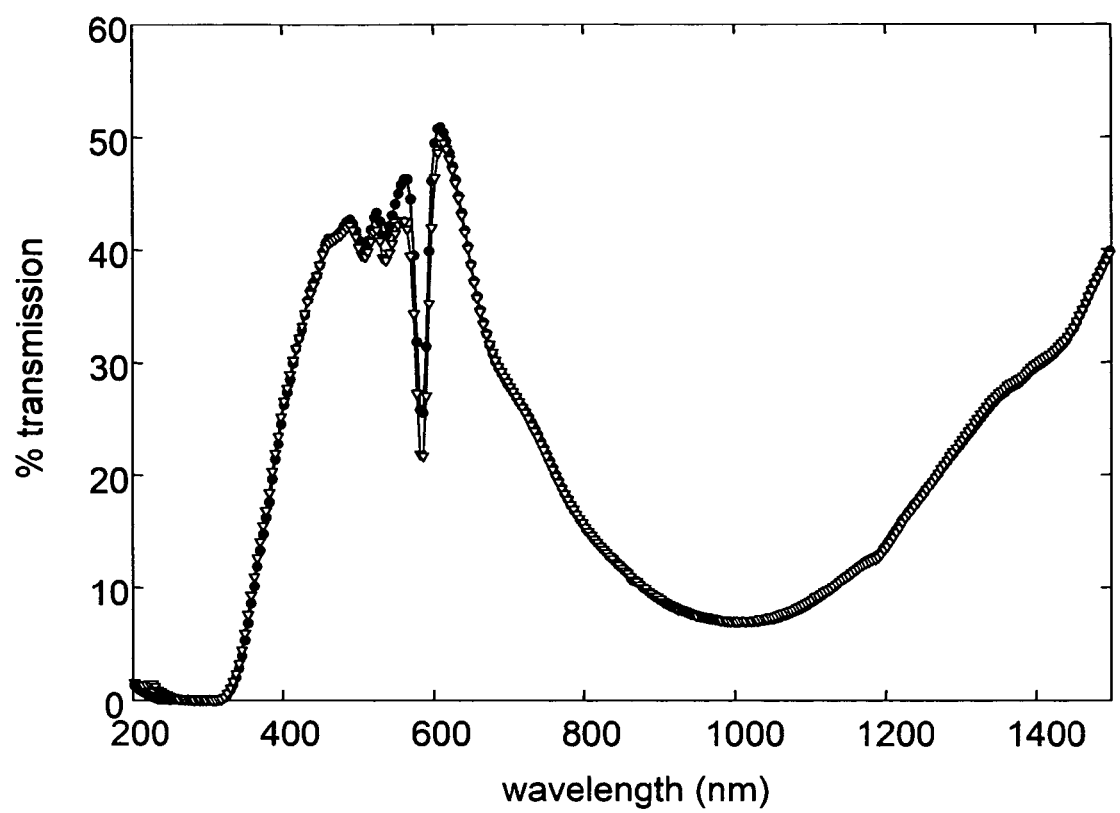
FIG. 6 represents a graph illustrating the transmission of electromagnetic radiation through one embodiment of a plasma display panel filter of the present invention.

FIG. 6 shows a graph of percent transmission of wavelengths ranging from 200 to 2000 nanometers through one embodiment of a PDP filter of the present invention. In this example, the filter has the following configuration: Anti-reflective glass//PVB//PET with EM shielding//PVB//clear glass. NIR absorption is achieved by the PVB interlayer. The PVB comprises 0.0063% of C.I. pigment red, 0.0245% of $LaB_6$, and 0.0023% of Gentex Filtron A193 and has a thickness of 0.76 mm. The color as measured using the calometric $L^*a^*b^*$-system can be described by $a^*=-1.3$ and $b^*=5.2$. The $b^*$ can be adjusted towards 0, with a minimum effect on total visual transmission using a dye absorbing specifically in the 560-580 nm range.

In FIG. 6, the solid circles represent the formulation and the triangles represent the formulation with color adjustment. As shown in FIG. 6, transmission around the 590 nanometer range is limited to less than 50 percent transmission, while transmission over 900 nanometers gradually increases to 50 percent and transmission at less than about 350 nanometers is close to zero.

One of ordinary skill in the art will be able to see that the configuration of layers used to generate the data shown in FIG. 6 can be altered to have only three layers by simply removing a layer of glass and PVB and applying an equivalent amount of the agents from the removed PVB layer to the PVB layer remaining. This configuration would correspond to the embodiment shown in FIG. 4.

EXAMPLE 2

Five phthalocyanine dyes are each disbursed in a plasticized poly(vinyl butyral) melt and formed into five 0.7 mm thick poly(vinyl butyral) sheets consisting of 27.5% plasticizer. The polymer sheet is than laminated with a PET layer having a copper grid onto a 2.1 mm thick panel of glass to yield a Glass//PVB//PET construct. The phthalocyanine dyes used—Excolor IR12, Excolor IR14, TX-Ex 906B, TX-Ex 910, and Excolor IR10A - are available from Nippon Shokubai (Osaka, Japan). The phthalocyanine dyes are dissolved in the poly(vinyl butyral) at a weight/weight concentration of 0.034%. Percent transmission at wavelengths from 400 to 1200 nanometers are recorded. Percent transmission is measured with a UV/NVIS/INIR spectrophotometer (Perkin Elmer Lambda 900, Perkin Elmer Corporation Wellesley, Mass.) at a scanning rate of 500 nm/minute. Results are shown in FIG. 7.

Figure 7:
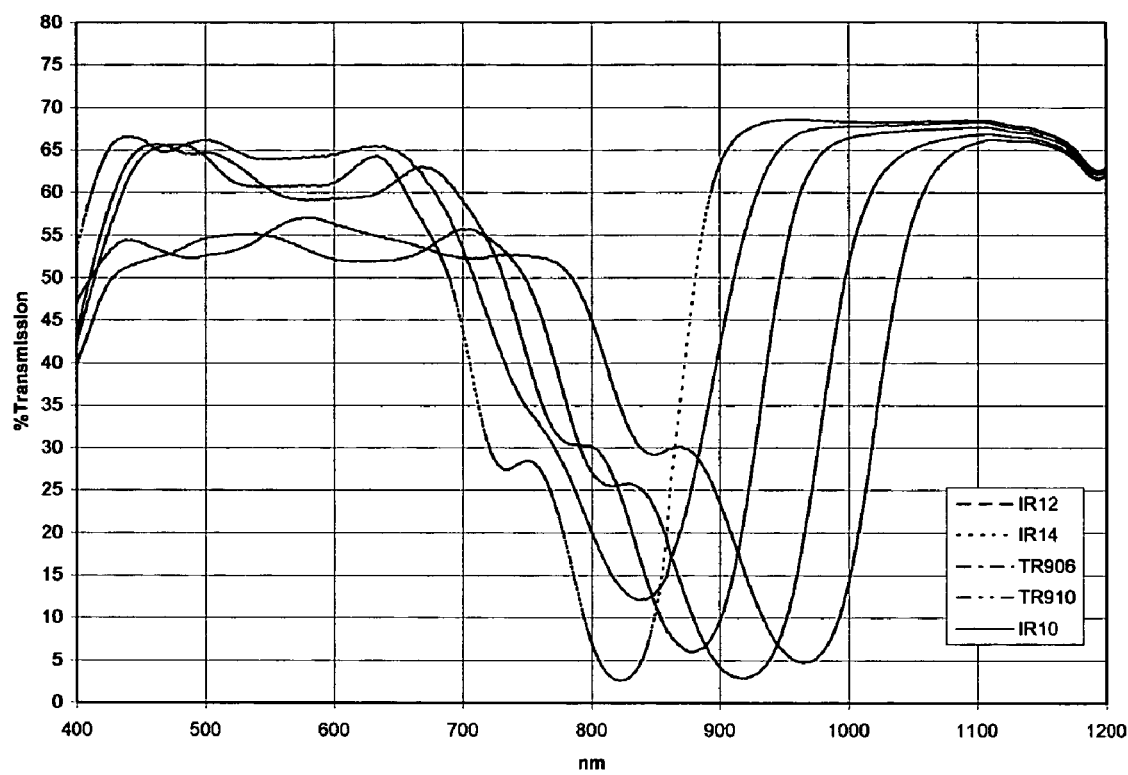
FIG. 7 represents a graph showing the percent transmission through five poly(vinyl butyral) sheets each containing a different phthalocyanine dye over a range of wavelengths.

As shown in FIG. 7, transmission across the visible spectrum from about 440 to about 800 nanometers is relatively high, and transmission in the near infrared and infrared region is significantly reduced.

Color properties of the five sheets described above are determined by using the CIELAB $L^*a^*b$ system. Results for color properties for the five sheets are as follows:

| Phthalocyanine Dye | a* | b* |
|---|---|---|
| Excolor IR10A | −1.6 | 2.4 |
| Excolor IR12 | −2.1 | −1.5 |
| Excolor IR14 | 0.8 | −2.9 |
| TX-Ex 906B | −2.8 | 2.8 |
| TX-Ex 910 | 1.1 | 1.8 |

EXAMPLE 3

Five phthalocyanine dyes are each dissolved in a plasticized poly(vinyl butyral) melt and formed into five poly(vinyl butyral) sheets and then laminated panels as in Example 1. The phthalocyanine dyes used are Pro-jet 900NP and Pro-jet 830NP (available from Avecia, Manchester, United Kingdom), YKR-3070, YKR-3080, and YKR-3081 (available from Yamamoto Chemicals, Inc. Osaka, Japan). Percent transmission at wavelengths ranging from 200 or 400 to 1500 nanometers are recorded as in Example 1. Results, not shown, indicate that each of the tested phthalocyanine dyes displays a lower visible/infrared transmission ratio than seen in the phthalocyanine dyes of Example 2. Further, the YKE dyes showed relatively low transmission at either end of the visible spectrum.

Color properties of the five sheets described above are determined according to Example 1. Results for color properties for the five sheets are as follows:

| Phthalocyanine Dye | a* | b* |
|---|---|---|
| Avecia Pro-jet 900NP | −2.9 | 7.1 |
| Avecia Pro-jet 830NP | −1.0 | 9.9 |
| YKR-3070 | −17.96 | 0.84 |
| YKR-3080 | −12.53 | 5.99 |
| YKR-3081 | −11.7 | −0.52 |

EXAMPLE 4

Figure 8:
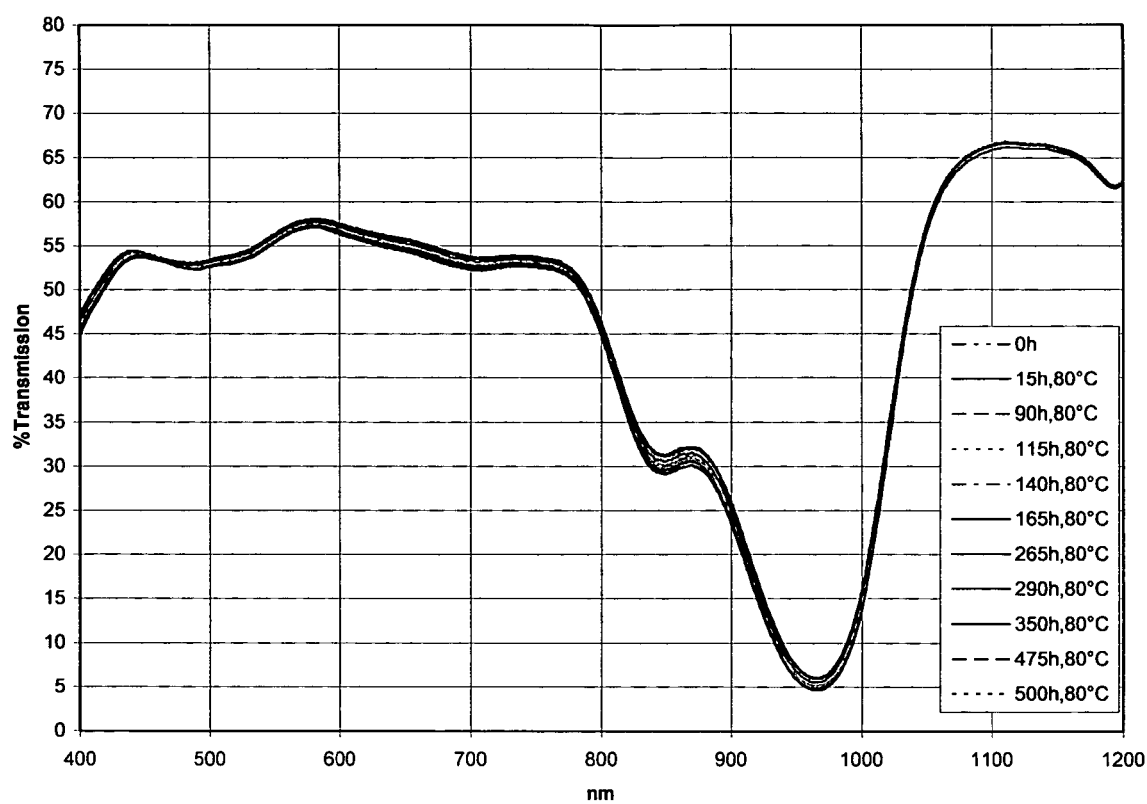
FIG. 8 represents a graph showing the percent transmission though a poly(vinyl butyral) sheet containing a single phthalocyanine dye over a range of wavelengths at 80° C. at various time points.
Figure 9:
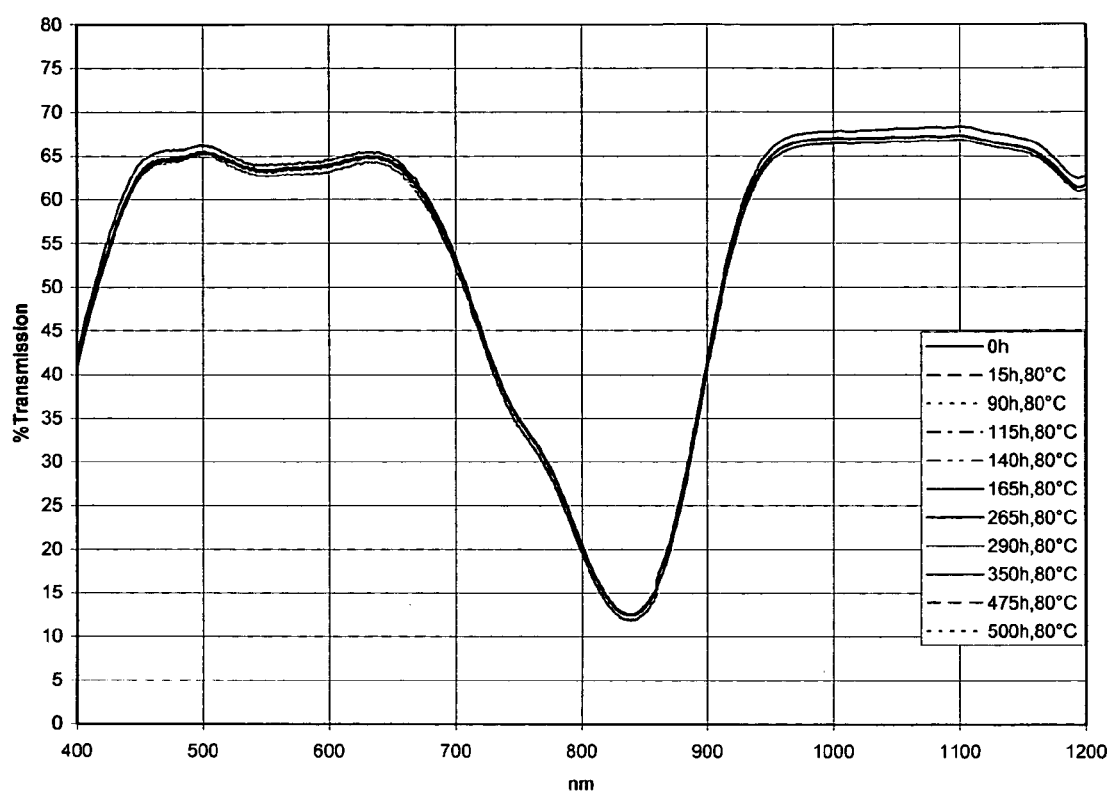
FIG. 9 represents a graph showing the percent transmission through a poly(vinyl butyral) sheet containing a single phthalocyanine dye over a range of wavelengths at 80° C. at various time points.

The laminates comprising phthalocyanine dyes produced in Example 1 are subjected to a constant temperature of 80° C. for a period of 500 hours to test for thermal stability. At ten different time points, each laminate is cooled to room temperature and tested for percent transmission. All five phthalocyanine dyes tested show excellent thermal stability. Results for Nippon Shokubai TX-Ex 910 and Nippon Shokubai Excolor IR10A are shown in FIGS. 8 and 9, respectively. The polymer sheet comprising Avecia Pro-jet 830-NP described in Example 2 is similarly tested (results not shown). Results indicate very good thermal stability through 600 hours of testing.

EXAMPLE 5

Various non-phthalocyanine dyes are tested for transmission characteristics. Five laminated panels comprising poly (vinyl butyral) sheets are prepared as in Examples 1 and 2 with a single dye. The dyes used are NK5706 and NK4680 (cyanine dyes-plus a quencher)(available from Hayashibara Biochemical Laboratories, Okayama, Japan), Kayasorb IRG022 (a diimonium dye) (available from Nippon Kayaku, Tokyo, Japan), CIR1081 (a diimonium dye) (available from Japan Carlit Company, Tokyo, Japan), and Sands 7816 (an aromatic amine dye) (available from H.W. Sands Corporation, Jupiter, Fla.). Each resulting sheet is tested for light transmission from 400 to 1500 nanometers. The cyanine and diimonium dyes are also tested for thermal stability at at least two time points.

Figure 10:
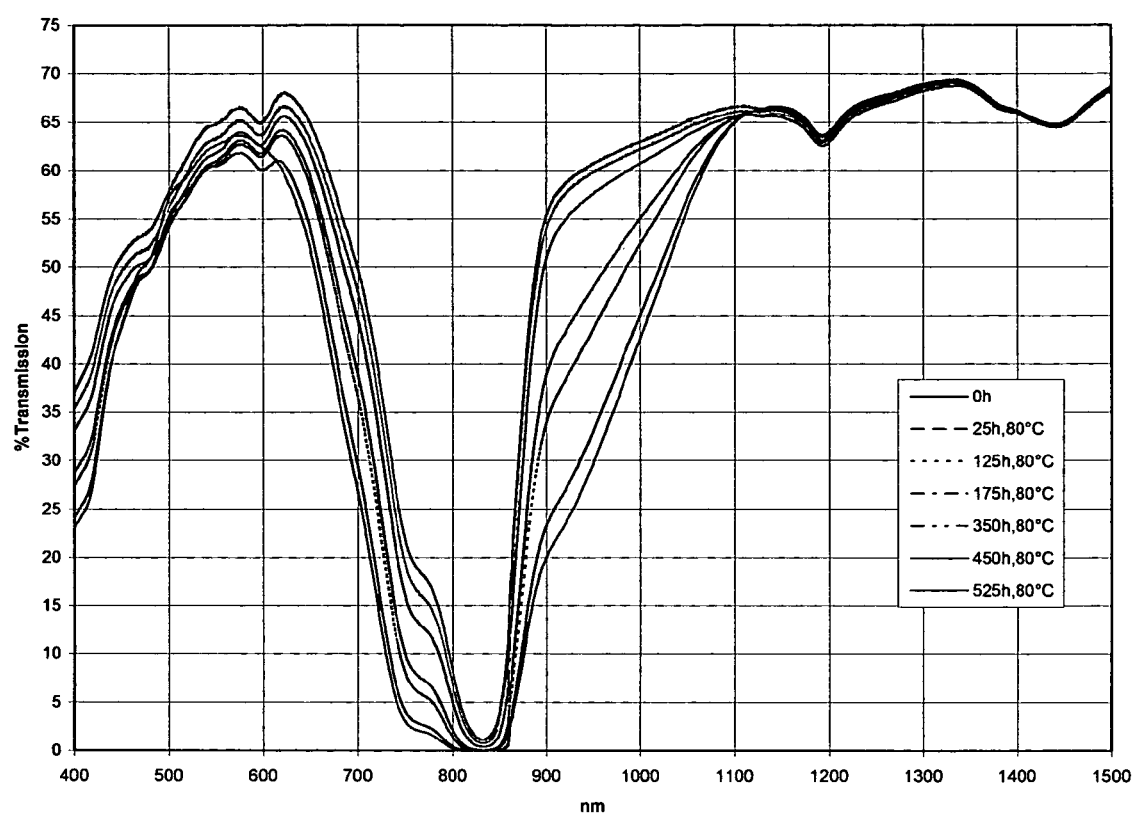
FIG. 10 represents a graph showing the percent transmission through a poly(vinyl butyral) sheet containing a single cyanine dye (non-phthalocyanine) over a range of wavelengths at 80° C. at various time points.

Results for the cyanine dye NK4680 +quencher are shown in FIG. 10. As can be seen in FIG. 10, this cyanine dye exhibits significant and uneven absorption within the visible spectrum, and significant temperature instability. NK5706+ quencher yielded similar results. The diimonium dyes showed absorption in the shorter wavelengths of the visible spectrum, and a very low visible/infrared transmission ratio. The aromatic amine dye showed very significant absorption in the 400-450 nanometer range, which is within the emission spectrum of the blue phosphor.

EXAMPLE 6

Figure 11:
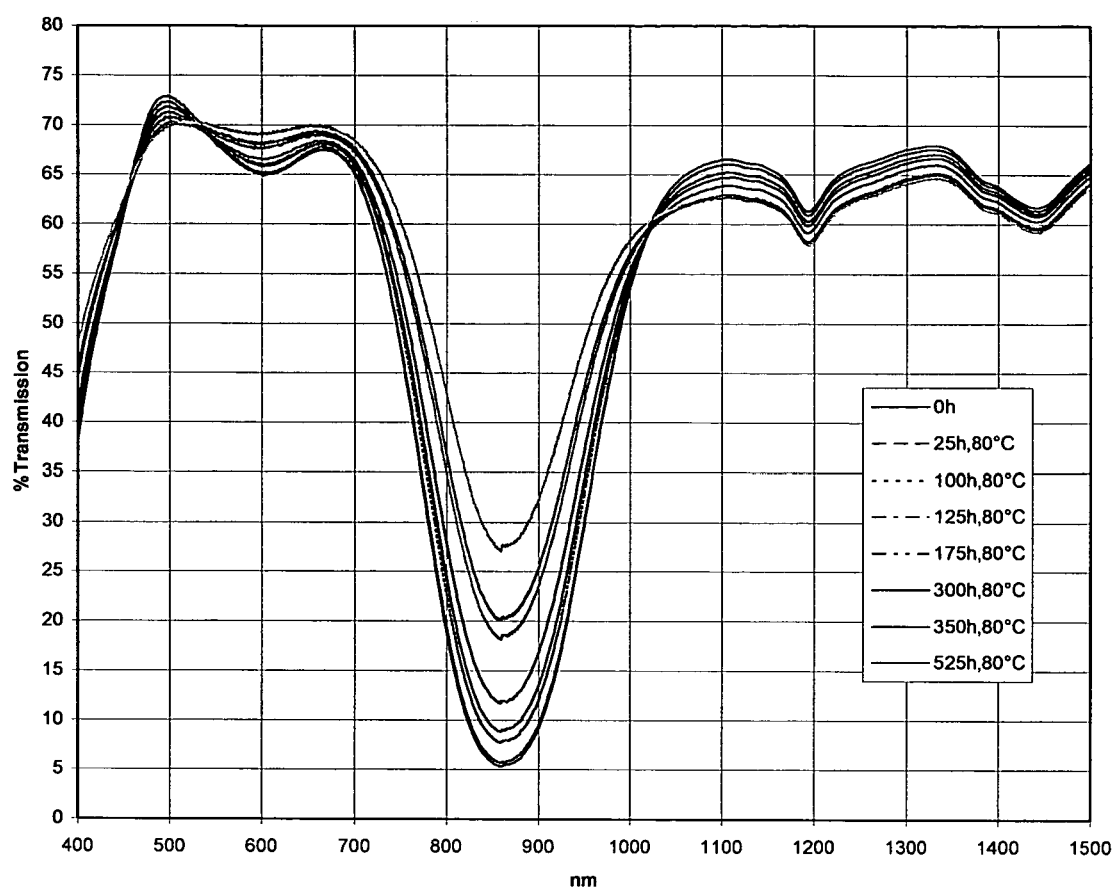
FIG. 11 represents a graph showing the percent transmission through a poly(vinyl butyral) sheet containing a single dithiol metal complex dye over a range of wavelengths at 80° C. at various time points.

A polymer sheet comprising the dithiol nickel complex dye MIR-101 (available from Midori Kagaku Company, Tokyo, Japan) is produced according to the method of Examples 1 and 2. The resulting sheet is tested for light transmission at four time points, as shown in FIG. 11.

Any figure reference numbers given within the abstract or any claims are for illustrative purposes only and should not be construed to limit the claimed invention to any one particular embodiment shown in any figure.

Unless otherwise indicated, Figures are not drawn to scale.

Each patent, application, document, journal article, or other reference cited herein is hereby incorporated herein in its entirety.

We claim:

1. A plasma display panel, comprising:
   a layered plasma display panel filter, comprising:
   a first layer comprising polyvinyl butyral or ethylene vinyl acetate;
   a second layer disposed in contact with said first layer, wherein said second layer comprises a polymeric material;
   a third layer disposed in contact with said first layer, wherein said third layer comprises glass;
   a fourth layer disposed in contact with said second layer, wherein, said fourth layer comprises polyvinyl butyral or ethylene vinyl acetate; and,
   a fifth layer disposed in contact with said fourth layer, wherein said fifth layer comprises a polymeric material.

2. The panel of claim 1, wherein said second layer further comprises an electromagnetic shield.

3. The panel of claim 2, wherein said electromagnetic shield comprises copper.

4. The panel of claim 2, wherein said electromagnetic shield comprises copper, silver, palladium, platinum, or gold.

5. The panel of claim 2, wherein either said first layer or said fourth layer comprise $LaB_6$.

6. The panel of claim 2, wherein both said first layer and said fourth layer comprise $LaB_6$.

7. The panel of claim 2, wherein said first layer, said fourth layer, or both, comprise a phthalocyanine dye, a dithiol metal complex dye, and $LaB_6$.

8. The panel of claim 1, wherein said fifth layer comprises an antireflective material.

9. The panel of claim 1, wherein said first layer and said fourth layer comprise polyvinyl butyral, and said second layer and said fifth layer comprise polyethylene terephthalate.

10. The panel of claim 1, wherein said first layer and said fourth layer comprise polyvinyl butyral.

11. The panel of claim 1, wherein said first layer and said fourth layer comprise ethylene vinyl acetate.

12. The panel of claim 1, wherein said second layer and said fifth layer comprise polyethylene terephthalate.

13. The panel of claim 1, wherein either said first layer or said fourth layer comprise a dithiol metal complex dye.

14. The panel of claim 13, wherein said dithiol metal complex dye is nickel complexed.

15. The panel of claim 1, wherein both said first layer and said fourth layer comprise a dithiol metal complex dye.

16. The panel of claim 15, wherein said dithiol metal complex dye is nickel complexed.

17. The panel of claim 1, wherein either said first layer or said fourth layer comprise a phthalocyanine dye.

18. The panel of claim 17, wherein said phthalocyanine dye is 0.01 to 0.20% on a weight/weight basis.

19. The panel of claim 1, wherein both said first layer and said fourth layer comprise a phthalocyanine dye.

20. The panel of claim 19, wherein said phthalocyanine dye is 0.01 to 0.20% on a weight/weight basis.

* * * * *